United States Patent [19]

Kinoshita et al.

[11] 4,256,715
[45] Mar. 17, 1981

[54] PROCESS FOR PREPARING CRYSTALLINE PHOSPHONITRILIC CHLORIDE OLIGOMERS

[75] Inventors: Tsukuru Kinoshita; Yuzuru Ogata; Masayoshi Suzue, all of Tokushima, Japan

[73] Assignee: Otsuka Chemical Co., Ltd., Osaka, Japan

[21] Appl. No.: 964,458

[22] Filed: Nov. 29, 1978

[30] Foreign Application Priority Data

May 4, 1978 [JP] Japan ............................. 53/53380

[51] Int. Cl.³ .............................................. C01B 25/10
[52] U.S. Cl. ................................................. 423/300
[58] Field of Search ..................................... 423/300

[56] References Cited

U.S. PATENT DOCUMENTS

| | | | |
|---|---|---|---|
| 3,359,080 | 12/1967 | Ridgway et al. | 423/300 |
| 3,462,247 | 8/1969 | Paddock et al. | 423/300 |
| 3,669,633 | 6/1972 | Beinfest et al. | 423/300 |
| 3,860,693 | 1/1975 | Graham | 423/300 |
| 3,869,540 | 3/1975 | Hardy | 423/300 |

*Primary Examiner*—O. R. Vertiz
*Assistant Examiner*—Wayne A. Langel
*Attorney, Agent, or Firm*—Armstrong, Nikaido, Marmelstein & Kubovcik

[57] ABSTRACT

An improved process for preparing tri- and tetraphosphonitrilic chlorides in a shortened period of time in high yields by reacting ammonium chloride with phosphorus pentachloride produced simultaneously with the progress of the reaction from phosphorus trichloride and chlorine, in an organic solvent inert to chlorine in the presence of a catalyst, while adding dropwise phosphorus trichloride and supplying chlorine gas to the reaction system.

5 Claims, No Drawings

PROCESS FOR PREPARING CRYSTALLINE PHOSPHONITRILIC CHLORIDE OLIGOMERS

BACKGROUND OF THE INVENTION

The present invention relates to a process for preparing phosphonitrilic chloride oligomers, and more particularly to an improved process for preparing tri- and tetra-phosphonitrilic chlorides in high yields.

It is well known that crystalline phosphonitrilic chloride oligomers, namely tri- and tetra-phosphonitrilic chlorides are the starting materials for preparing poly-phosphonitrilic chloride generally called inorganic rubber. The use of poly-phosphonitrilic chloride derivatives of various kinds is very wide and they are employed availably as plastics, rubbers, plasticizers and fertilizers. Particularly, poly-phosphonitrilic chloride derivatives in use as plastics are watched in point of the flame-resistance or nonflammability, since combustion of plastics becomes a social problem.

The phosphonitrilic chloride oligomers were found first in the year 1834 by Liebig as by-products in the reaction of ammonium chloride and phosphorus pentachloride which was conducted for the purpose of synthesizing phosphonitrilic amide $NP(NH_2)_2$. After that, many researches as to the phosphonitrilic chloride oligomers have been made, and typical methods for synthesizing the oligomers hitherto known are as follows:

[A] Methods using phosphorus pentachloride
 (a) $PCl_5 + NH_4Cl$
 (b) $PCl_5 + NH_3$
 (c) $PCl_5 + NH_3 + HCl$
[B] Methods using phosphorus trichloride
 (d) $PCl_3 + Cl_2 + NH_4Cl$
 (e) $PCl_3 + Cl_2 + NH_3$
[C] Method using white phosphorus
 (f) $P + Cl_2 + NH_3$
[D] Methods using phosphorus nitride
 (g) $P_3N_3 + Cl_2$
 (h) $P_4N_5 + Cl_2$ Among these typical synthetic methods [A] to [D], the methods [D]-(g) and [D]-(h) are not suited for the synthesis on an industrial scale, because of being in danger of explosion.

Method on which the most researches have been made up to now is the method [A]-(a) using phosphorus pentachloride and ammonium chloride. The method [A]-(a) is classified into two large methods. One of them is a method in which phosphorus pentachloride and 1.0 to 2.0 moles of ammonium chloride per mole of phosphorus pentachloride are first added to a reaction vessel, and then reacted in an organic solvent for 15 to 30 hours at a boiling point of the solvent under reflux. The yield of the phosphonitrilic chloride oligomers is low and at most 30% to 40% by weight. Another is a method in which the reaction is carried out by adding dropwise a solution of phosphorus pentachloride in an organic solvent to a dispersion of ammonium chloride in the same organic solvent. This method is the improvement of the former to reduce the production of higher cyclic phosphonitrilic chlorides $(NPCl_2)_{5-11}$ and linear compounds $(NPCl_2)_n \cdot PCl_5$, which are inevitably by-produced at the time of preparing the phosphonitrilic chloride oligomers, particularly tri- and tetra-phosphonitrilic chlorides necessary for preparing poly-phosphonitrilic chloride. The yield of the oligomers is raised to 50% to 60% by weight. However, it is necessary to previously dissolve phosphorus pentachloride in an organic solvent at a temperature of 80° to 90° C., and moreover it is necessary to maintain a pathway for adding dropwise the solution of phosphorus pentachloride at the above temperature. Therefore, this method is not also necessarily suitable for the industrial preparation.

The method [A]-(b) has the disadvantages that in addition to choking of a tube for introducing $NH_3$ gas and difficulty of controlling the amount of flowing $NH_3$ gas, the yield of the oligomers is only about 20% to about 30% by weight.

The method [A]-(c) is conducted by first supplying ammonia gas and hydrogen chloride gas into an organic solvent to produce ammonium chloride, and then adding phosphorus pentachloride into the solvent to react them so as to produce the oligomers. The object of this method is to make ammonium chloride particles as small as possible in order to raise the yield of the oligomers and to shorten the reaction time. For this purpose, the temperature for producing ammonium chloride in advance of the reaction of ammonium chloride and phosphorus pentachloride is desirable to be lower than 30° C. to prevent the increase of the particle size of the produced ammonium chloride particles. Since the reaction of producing ammonium chloride is an exothermic reaction, a cooling apparatus is required. Therefore, there are required thermal procedures of two stages which are contrary to each other, at the first stage of which ammonia and hydrogen chloride are reacted to produce ammonium chloride with cooling and at the second stage of which the resulting ammonium chloride and phosphorus pentachloride are reacted with heating. This is industrially disadvantageous.

The method [B]-(d) which has been studied is a method where phosphorus trichloride is added to a reaction medium at once before starting the reaction. In such a method, it is difficult to smoothly start the reaction at a temperature of more than 100° C., since the boiling point of phosphorus trichloride is low, i.e. about 75° C.

The methods [B]-(e) and [C]-(f) have the disadvantage of choking of a tube for introducing $NH_3$ gas.

It is also known to employ an anhydrous metal chloride such as aluminum chloride, zinc chloride, magnesium chloride or titanium chloride as a catalyst in order to shorten the reaction time. However, these metal chloride catalysts are deliquescent or easy to hydrolyze and, therefore, are unhandy. Moreover, they have a little effect of raising the yields of the phosphonitrilic chloride oligomers and only have the effect of shortening the reaction time.

OBJECTS OF THE INVENTION

It is an object of the present invention to provide a process for preparing phosphonitrilic chloride oligomers.

A further object of the invention is to provide a process for preparing crystalline phosphonitrilic chloride oligomers in high yields.

A still further object of the invention is to provide a process for preparing phosphonitrilic chloride oligomers in a shortened period of time.

Another object of the invention is to provide a process for preparing crystalline phosphonitrilic chloride oligomers, i.e. tri- and tetra-phosphonitrilic chlorides in high yields in a shortened period of time.

These and other objects of the invention will become apparent from the description hereinafter.

DETAILED DESCRIPTION

It has now been found that the above-mentioned objects can be attained by carrying out a reaction of ammonium chloride with phosphorus pentachloride produced from phosphorus trichloride and chlorine, at a temperature of 100° to 200° C. in an organic solvent inert to chlorine in the presence of a catalyst, while adding dropwise phosphorus trichloride to the organic solvent at a rate of 0.003 to 0.07 mole/minute per mole of ammonium chloride and simultaneously supplying an approximately equimolar amount of chlorine gas with the added phosphorus trichloride into the organic solvent at approximately the same rate as the addition rate of phosphorus trichloride to produce phosphorus pentachloride.

According to the present invention, since phosphorus pentachloride to be reacted with ammonium chloride is produced not so as to become in excess in the reaction system by adding dropwise phosphorus trichloride and supplying chlorine gas at a rate corresponding to the addition rate of phosphorus trichloride, the production of the by-produced linear and higher cyclic phosphonitrilic chloride oligomers can be remarkably decreased and the crystalline phosphonitrilic chloride oligomers, i.e. tri- and tetra-phosphonitrilic chlorides can be produced in high yields in a shortened period of time. Also, since liquid phosphorus trichloride is employed as the starting material in the present invention, the process of the invention has the advantages that the handling is easy and the productivity can be raised by increasing the amount of phosphorus trichloride against the amount of the organic solvent.

Ammonium chloride and a catalyst are dispersed in an organic solvent inert to chlorine. The temperature of the dispersion is raised to 100° to 200° C., and phosphorus trichloride is added dropwise to the dispersion under reflux with agitation, while chlorine gas is supplied into the dispersion. The resulting phosphorus pentachloride reacts with ammonium chloride to produce the phosphonitrilic chloride oligomers.

A rate of adding dropwise phosphorus trichloride is selected from 0.003 to 0.07 mole/minute, preferably 0.006 to 0.02 mole/minute, per mole of ammonium chloride. When the addition rate is greater than the above range, the proportion of by-products increases. The addition of phosphorus trichloride at a rate smaller than the above range is undesirable, since it takes too much time to prepare the oligomers. At the same time as adding dropwise phosphorus trichloride, an approximately equimolar amount of chlorine gas with phosphorus trichloride is supplied into the dispersion at approximately the same rate as the addition rate of phosphorus trichloride. In the present invention, phosphorus trichloride may be prepared from phosphorus and chlorine gas and then added dropwise to the reaction system.

After the completion of the addition of phosphorus trichloride and the supply of chlorine gas, the reaction is preferably further continued at a temperature of 100° to 200° C. for about 0.5 to about 3 hours under reflux with agitation to complete the reaction.

The catalyst is employed in an amount of 0.01% to 10% by weight, preferably 0.1% to 10% by weight, based on the weight of phosphorus trichloride. When the amount of the catalyst is less than 0.01% by weight, the reaction cannot be accelerated, and when the amount of the catalyst is more than 10% by weight, the production of undesirable linear oligomers increases. Examples of the catalyst employed in the present invention are metals of Groups II-A, II-B, III-A, IV-A, IV-B and VIII of the Periodic Table such as aluminum, magnesium, barium, titanium, tin, zinc and nickel, clay minerals such as bentonite, zeolite and activated clay, metal oxides of Groups II-A, II-B, III-A, IV-A, IV-B and VIII of the Periodic Table such as MgO, CaO, ZnO, $B_2O_3$, SnO, $TiO_2$ and CoO, metal sulfides of Groups II-A and II-B such as BaS, CaS and ZnS, metal salts of saturated and unsaturated fatty acids having 2 to 18 carbon atoms of Groups II-A and II-B of the Periodic Table such as $Ba(CH_3COO)_2$, $Mg(C_{18}H_{35}O_2)_2$ and $Zn(C_{18}H_{35}O_2)_2$, metal complexes of Groups II-A and II-B of the Periodic Table such as acetylacetonatomagnesium $[Mg(C_5H_7O_2)_2]$ and acetylacetonatozinc $[Zn(C_5H_7O_2)_2]$, organometallic compounds of Groups II-A and II-B of the Periodic Table such as $(C_2H_5)_2Zn$ and $(C_2H_5)_2Mg$, metal peroxides of Groups II-A and II-B of the Periodic Table such as $ZnO_2$, $CdO_2$ and $MgO_2$, metal hydroxides of Groups II-A, III-A and VIII of the Periodic Table such as $Mg(OH)_2$, $Ca(OH)_2$, $Al(OH)_3$ and $Co(OH)_2$, metal chlorides of Groups II-A, II-B, III-A, IV-A and VIII of the Periodic Table such as $MgCl_2$, $ZnCl_2$, $AlCl_3$, $SnCl_4$, $FeCl_2$, $CoCl_2$ and $NiCl_2$, and metal sulfates, metal nitrates, metal phosphates and their ammonia complexes of Groups II-B, III-A and VIII such as $ZnSO_4$, $CoSO_4$ and trinitratotriamminecobalt (III) $[Co(NH_3)_3(NO_3)_3]$. These catalysts may be employed singly or in admixture thereof.

In the present invention, the reaction is carried out in an organic solvent inert to chlorine. Examples of the organic solvent employed in the present invention are tetrachloroethylene, tetrachloroethane, chlorobenzene, dichlorobenzene, xylene and nitrobenzene. Chlorobenzene is preferably employed.

The organic solvent is employed in a ratio of 0.1 to 10 ml., preferably 5 to 6 ml., to one gram of phosphorus trichloride. When the amount of the solvent is more than the above range, the yield of the crystalline oligomers lowers, and when the amount of the solvent is less than the above range, productivity lowers.

Ammonium chloride is employed in an amount of 0.8 to 10 moles, preferably 1.5 moles, per mole of phosphorus trichloride. Although the particle size of ammonium chloride is not limited particularly, fine particles are desirable, since the reaction proceeds smoothly.

According to the present invention, the phosphonitrilic chloride oligomers can be obtained in a yield of about 90% to about 99% by weight on the basis of phosphorus trichloride. The crystalline phosphonitrilic chloride oligomers, i.e. tri- and tetra-phosphonitrilic chlorides are recovered in a known manner. The reaction product is separated into a component soluble in petroleum ether (cyclic phosphonitrilic chloride oligomers) and a component insoluble in petroleum ether (linear phosphonitrilic chloride oligomers). The crystalline phosphonitrilic chloride oligomers are obtained by distilling away mostly petroleum ether from the petroleum ether-soluble component and then subjecting it to filtration with suction to remove the oily higher cyclic compounds. Thus, the tri- and tetra-phosphonitrilic chlorides are obtained in high yields.

The present invention is more particularly described and explained by means of the following Examples, in which all % are by weight unless otherwise noted.

EXAMPLE 1

A one liter flask equipped with a reflux condenser, a thermometer, a stirrer and a dropping funnel was charged with 500 ml. of monochlorobenzene, 36.5 g. (0.68 mole) of ammonium chloride and 0.5 g. of zinc oxide to give a dispersion. The temperature of the dispersion was raised to 130° C., and 85.1 g. of phosphorus trichloride was added dropwise to the dispersion over 96 minutes under reflux. Simultaneously with the addition of phosphorus trichloride, 45.4 g. of chlorine gas was supplied over 96 minutes. After the completion of the supply of phosphorus trichloride and chlorine gas, the reaction mixture was further refluxed at 132° C. for 144 minutes to complete the reaction. Total reaction time was 4 hours.

The reaction mixture was filtered with suction to remove the unreacted ammonium chloride. Monochlorobenzene was then distilled away from the resulting filtrate at a temperature of 30° to 40° C. under a reduced pressure of 10 to 20 mmHg to give 70.4 g. of the reaction product. The yield of the reaction product was 98.1% on the basis of phosphorus trichloride. The proportions of a petroleum ether-soluble component (cyclic compounds) and a petroleum ether-insoluble component (linear compounds) of the reaction product were 97% and 3%, respectively. Also, the ratio of the crystalline phosphonitrilic chloride compounds, i.e. tri- and tetra-phosphonitrilic chlorides to oily higher cyclic phosphonitrilic chloride compounds in the petroleum ether-soluble component was 94.5:5.5.

COMPARATIVE EXAMPLE 1

A one liter four necked flask equipped with a reflux condenser, a thremometer and a stirrer was charged with 500 ml. of monochlorobenzene, 129.1 g. (0.62 mole) of phosphorus pentachloride and 36.5 g. (0.68 mole) of ammonium chloride. A reaction was carried out at 132° C. for 5 hours under reflux with stirring.

The reaction product was obtained in a yield of 88.3% on the basis of phosphorus pentachloride, and contained 25.4% of linear phosphonitrilic chloride oligomers which were a petroleum ether-insoluble component. The ratio of the crystalline phosphonitrilic chloride oligomers to oily higher cyclic phosphonitrilic chloride oligomers in the petroleum ether-soluble component was 53.3:46.7.

EXAMPLES 2 TO 11

The procedure of Example 1 was repeated except that a catalyst as shown in the following Table was employed and total reaction time was 3 hours.

The results are shown in the following Table together with the result of Example 1.

| | Catalyst | | Yield of Reaction Product % | Composition of Reaction Product | | Composition of Cyclic Compounds | |
|---|---|---|---|---|---|---|---|
| Example No. | Kind | Amount g. | | Linear Compounds % | Cyclic Compounds % | Crystalline Compounds % | Higher Cyclic Compounds % |
| Ex. 1 | Zinc oxide | 0.5 | 98.1 | 3.0 | 97.0 | 94.5 | 5.5 |
| Ex. 2 | aluminum chloride | 0.85 | 97.2 | 15.3 | 84.7 | 95.5 | 4.5 |
| Ex. 3 | Stannous oxide | 0.85 | 98.0 | 3.5 | 96.5 | 95.0 | 5.0 |
| Ex. 4 | Aluminum (powder) | 0.2 | 96.5 | 12.7 | 87.3 | 91.5 | 8.5 |
| Ex. 5 | Bentonite | 0.85 | 97.3 | 10.6 | 89.4 | 86.3 | 13.7 |
| Ex. 6 | Zinc sulfide | 0.5 | 97.5 | 2.5 | 97.5 | 94.0 | 6.0 |
| Ex. 7 | Magnesium stearate | 1.5 | 96.0 | 1.8 | 98.2 | 91.2 | 8.8 |
| Ex. 8 | Acetylacetonatozinc | 1.5 | 95.5 | 2.3 | 97.7 | 92.6 | 7.4 |
| Ex. 9 | Zinc sulfate | 0.5 | 97.2 | 1.3 | 98.7 | 93.1 | 6.9 |
| Ex. 10 | Trinitratotriamminecobalt (III) | 1.5 | 96.1 | 4.5 | 95.5 | 91.5 | 8.5 |
| Ex. 11 | Zinc peroxide | 0.5 | 95.1 | 1.3 | 98.7 | 85.7 | 14.3 |

What we claim is:

1. In a process for preparing crystalline phosphonitrilic chloride oligomers by reacting phosphorus pentachloride with ammonium chloride in an organic solvent inert to chlorine in the presence of a catalyst, the improvement which comprises adding dropwise phosphorus trichloride to a dispersion of ammonium chloride and said catalyst in an organic solvent at a rate of 0.003 to 0.07 mole/minute per mole of ammonium chloride simultaneously with the supply of an equimolar amount of chlorine gas based on said phosphorus trichloride at the same rate as the addition rate of said phosphorus trichloride at a temperature of 100° to 200° C. to produce said phosphorus pentachloride, said catalyst being at least one member selected from the group consisting of oxides of metals of Groups II-A, II-B, III-A, IV-A, IV-B and VIII of the Periodic Table; sulfides of metals of Groups II-A and II-B of the Periodic Table, fatty acid salts of metals of Groups II-A and II-B of the Periodic Table, acetylacetonatomagnesium, acetylacetonatozinc, organometallic compounds of metals of Groups II-A and II-B of the Periodic Table, peroxides of metals of Groups II-A and II-B of the Periodic Table, hydroxides of metals of Groups III-A and VIII of the Periodic Table and magnesium hydroxide; and said catalyst being employed in an amount of 0.01% to 10% by weight based on the weight of the phosphorus trichloride.

2. The process of claim 1, wherein said phosphorus trichloride is added dropwise at a rate of 0.006 to 0.02 mole/minute per mole of ammonium chloride.

3. The process of claim 1, wherein after the completion of the addition of phosphorus trichloride and the supply of chlorine gas, the reaction of phosphorus pentachloride with ammonium chloride is further continued at a temperature of 100° to 200° C. for 0.5 to 3 hours.

4. The process of claim 1, wherein said ammonium chloride is employed in an amount of 0.8 to 10 moles per mole of phosphorus trichloride.

5. The process of claim 1, wherein said catalyst is at least one member selected from the Group consisting of MgO, CaO, ZnO, $B_2O_3$, SnO, $TiO_2$, CoO, BaS, CaS, ZnS, $Ba(CH_3COO)_2$, $Mg(C_{18}H_{35}O_2)_2$, $Zn(C_{18}H_{35}O_2)_2$, $[Mg(C_5H_7O_2)_2]$, $[Zn(C_5H_7O_2)_2]$, $(C_2H_5)_2Zn$, $(C_2H_5)_2Mg$, $ZnO_2$, $CdO_2$, $MgO_2$, $Mg(OH)_2$, $Al(OH)_3$, and $Co(OH)_2$.

* * * * *